(12) United States Patent
Kidd et al.

(10) Patent No.: US 6,786,559 B1
(45) Date of Patent: Sep. 7, 2004

(54) CONDUCTIVE WHEEL

(75) Inventors: Michael T. Kidd, Delton, MI (US); Bowdie Isanhart, Coleman, MI (US)

(73) Assignee: Colson Caster Corporation, Kalamazoo, MI (US)

( * ) Notice: Subject to any disclaimer, the term of this patent is extended or adjusted under 35 U.S.C. 154(b) by 0 days.

(21) Appl. No.: 10/692,656

(22) Filed: Oct. 24, 2003

(51) Int. Cl.$^7$ ................................................ A63C 17/22
(52) U.S. Cl. ........................... 301/5.3; 16/18 R; 16/45
(58) Field of Search ...................... 301/5.3, 64.702, 301/105.1, 10.1; 152/325; 361/212, 217, 218, 219; 191/63; 104/178; 16/18 R, 45, 47, 35 R

(56) References Cited

U.S. PATENT DOCUMENTS

| | | | |
|---|---|---|---|
| 1,682,899 A | * | 9/1928 | Fletcher ........................ 152/7 |
| 2,686,891 A | | 8/1954 | Burgin |
| 3,815,959 A | * | 6/1974 | Hill ........................ 301/5.306 |
| 4,072,373 A | | 2/1978 | Black |
| 4,318,204 A | | 3/1982 | Black |
| 4,716,997 A | | 1/1988 | Gibson |
| 4,779,321 A | * | 10/1988 | Black ........................ 29/897.2 |
| 6,422,656 B2 | | 7/2002 | Denner et al. |

FOREIGN PATENT DOCUMENTS

| | | | |
|---|---|---|---|
| CH | 643189 A5 | * 5/1984 | ............. B60B/5/02 |

* cited by examiner

Primary Examiner—Frantz F. Jules
(74) Attorney, Agent, or Firm—Barnes & Thornburg

(57) ABSTRACT

A wheel assembly which includes a bearing assembly housed in an electrically conductive outer shell. A hollow sleeve of synthetic resin material impregnated with electrically conductive material is operatively electrically coupled to a peripheral surface of the electrically conductive outer shell. The hollow sleeve has at least one radially outwardly extending stem integral therewith. A synthetic resin material hub and tread is configured to envelop the metallic outer shell, the hollow sleeve and the stem. A distal end of the stem terminates either flush with or projects radially outwardly of a peripheral surface of the tread to contact a surface supporting the wheel construction with each revolution of the wheel construction and to effectively facilitate a discharge of static electricity through the hollow sleeve and the stem in response thereto.

9 Claims, 3 Drawing Sheets

CONDUCTIVE WHEEL

FIELD OF THE INVENTION

This invention relates to a wheel assembly and, more particularly, relates to a synthetic resin material molded wheel construction having a static electricity discharge feature associated therewith.

BACKGROUND OF THE INVENTION

Wheel constructions for a wheel primarily used in casters produced under high production conditions are, in many cases, used in association with shopping carts and other material handling carts. In instances where the high production wheels are made of a synthetic resin material, both the wheel and the floor on which it is rolling are generally non-conductive and, as a result, when non-conductive materials come into contact and separate, they will cause a division in protons (positive charge) and electrons (negative charge) in the materials as they come into contact and separate. This process is known as triboelectric generation. In other words, as the shopping cart is moved across the floor, the wheels and the floor are non-conductive and the wheel and the flooring trade electrical charges with the floor becoming one polarity and the cart assuming the opposite polarity. During this process, the charge build up in the wheels will transfer to the tubular steel frame of the cart to the plastic or metal cage of the cart. The plastic or metal cage has the ability to act as a capacitor and store a significant electrical charge. Since the wheels isolate the cart cage from ground, the cart cage can accumulate a significant surface charge because it is not readily discharged through any grounding.

Patrons using the grocery carts generally are capable of feeling static discharges when the voltage level is in excess of 3,000 volts. During testing of cart wheels on waxed concrete and tile flooring, discharges in excess of 18,000 volts have been measured.

Accordingly, it is desirable to provide a synthetic resin material high production wheel construction which has a static electricity discharge feature embedded therein and without introducing excessive cost to the wheel manufacturing process.

It is a further object of this invention to provide a wheel construction, as aforesaid, wherein the static electricity discharge feature is incorporated into the standard molding process for the synthetic resin material molded wheel construction.

It is a further object of this invention to provide a wheel construction, as aforesaid, wherein the bearing construction for the wheel is entirely electrically conductive and the static electricity discharge feature is attached to the bearing assembly and extends radially through the material of the hub and tread to engage the floor surface to effect a discharge through the aforesaid static electricity discharge feature.

It is a further object of this invention to provide a wheel construction, as aforesaid, that utilizes a static electricity discharge feature without diminishing the performance characteristic of the wheel assembly.

SUMMARY OF THE INVENTION

The objects and purposes of the invention are met by providing a wheel assembly which includes a bearing assembly for the wheel assembly housed in an electrically conductive outer shell. A hollow sleeve of synthetic resin material impregnated with electrically conductive material is operatively electrically coupled to a peripheral surface of the electrically conductive outer shell. The hollow sleeve has at least one radially outwardly extending stem integral therewith. A synthetic resin material hub and tread is configured to envelop the metallic outer shell, the hollow sleeve and the stem. A distal end of the stem terminates either flush with or projects radially outwardly of a peripheral surface of the tread to contact a surface supporting the wheel construction with each revolution of the wheel construction and to effectively facilitate a discharge of static electricity through the hollow sleeve and the stem in response thereto.

BRIEF DESCRIPTION OF THE DRAWINGS

Other objects and purposes of this invention will be apparent to persons acquainted with wheel assemblies of this general type upon reading the following specification and inspecting the accompanying drawings, in which.

DETAILED DESCRIPTION

Figure 1:
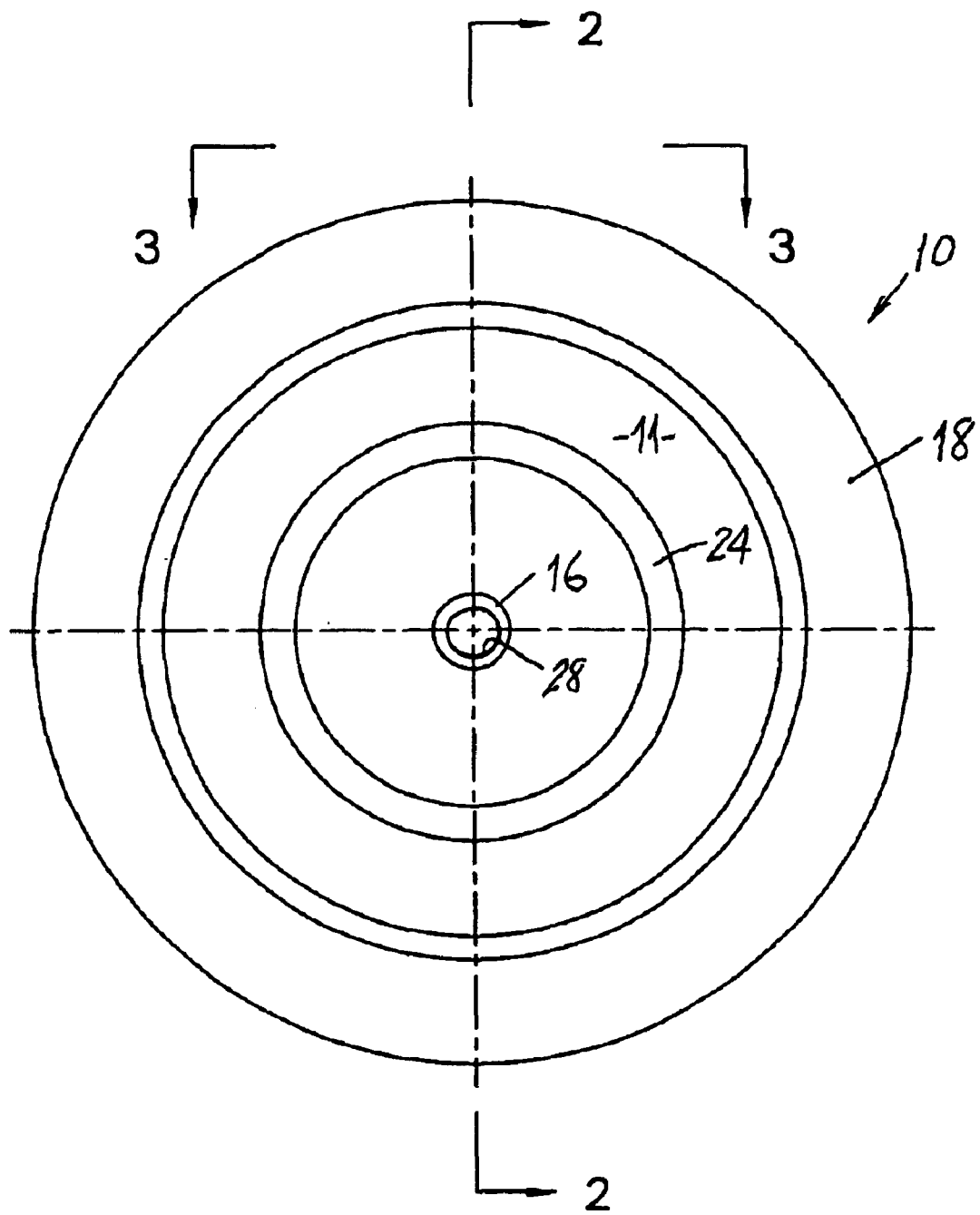
FIG. 1 is an elevational view of a wheel embodying the invention.
Figure 2:
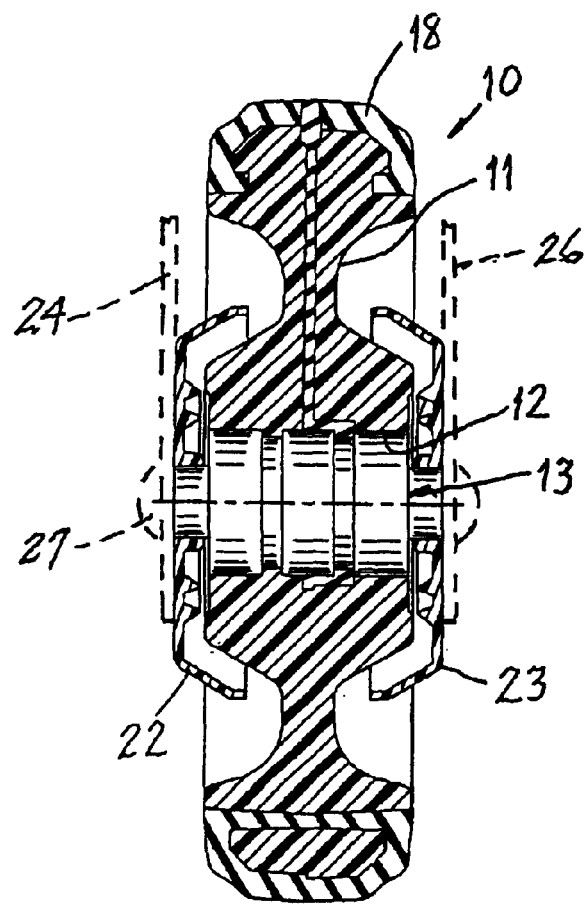
FIG. 2 is a sectional view taken along the line 2—2 of FIG. 1.
Figure 4:
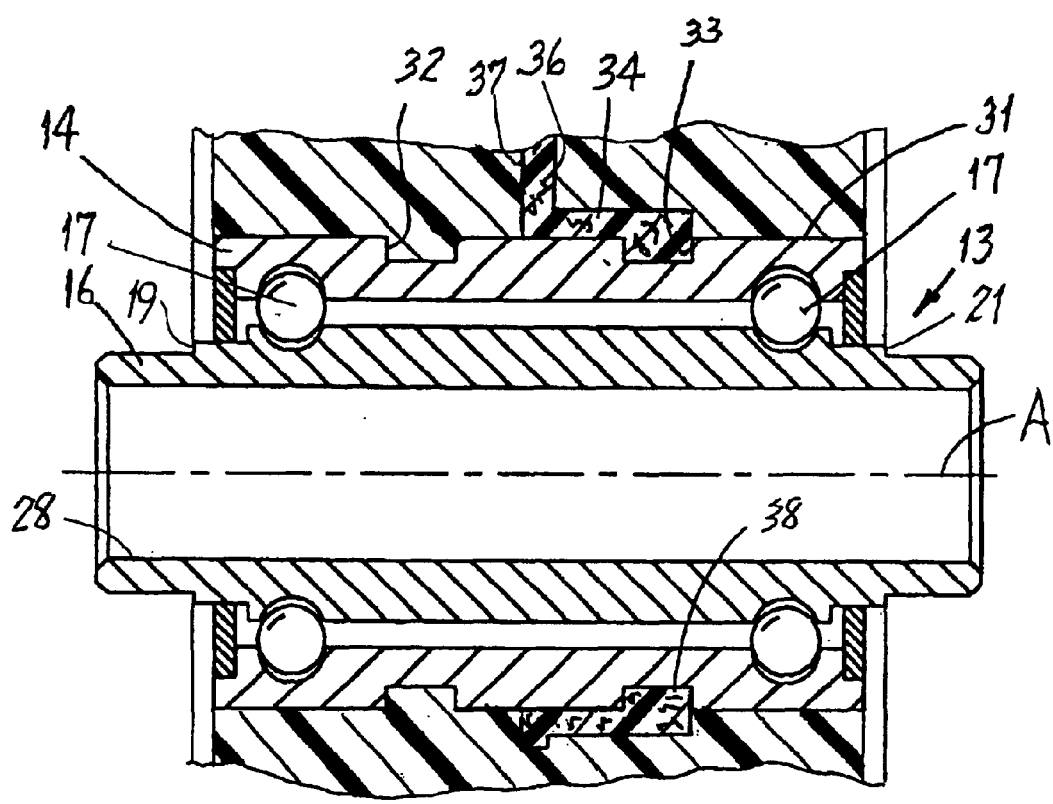
FIG. 4 is an enlarged cross section of the bearing assembly for the wheel construction.

FIGS. 1 and 2 illustrate a wheel assembly 10 utilized for a multitude of purposes, including a use on shopping carts. The wheel assembly 10 includes a synthetic resin material hub 11 having a central hole 12 therethrough in which is provided a bearing assembly 13. In this particular embodiment, the bearing assembly 13 (FIG. 4) includes an electrically conductive outer shell 14, here a metallic shell, having internally thereof a hollow axle 16. Both the axle 16 and the outer shell 14 have respective bearing races for rotatably supporting a plurality of ball bearings 17 therein to facilitate the outer shell 14 rotating with respect to the axle 16. The outer periphery of the hub 11 has synthetic resin material tread 18 secured thereto.

The axle 16 has shoulders 19 and 21 which locate a pair of synthetic resin material end caps 22 and 23. The wheel is usually assembled between a pair of legs 24 and 26 of a conventional inverted U-shaped frame of which the aforesaid legs 24 and 26 are a part thereof. The legs 24 and 26 straddle the wheel assembly 10 and a pin 27 extends through a pair of axially aligned openings in the legs 24 and 26 and a hollow interior 28 of the axle 16 to render the wheel assembly 10 relatively rotatably supported on the inverted U-shaped frame.

The aforesaid construction of the wheel assembly and its mounting on an inverted U-shaped frame are conventional and do not form any part of the invention disclosed herein.

Figure 3:
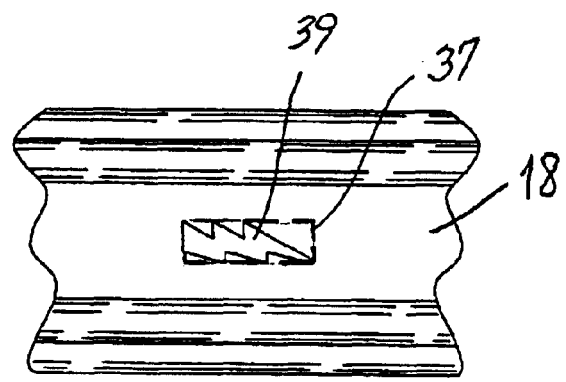
FIG. 3 is a view taken along the line 3—3 of FIG. 1.

Turning now to the inventive improvement to the aforesaid wheel assembly, the peripheral surface 31 of the outer shell 14 of the bearing assembly 13 includes at least one, here two, annular grooves 32 and 33. A hollow sleeve 34 of synthetic resin material impregnated with electrically conductive material 36, such as stainless steel fibers, are operatively electrically coupled to the peripheral surface 31 of the electrically conductive outer shell 14. The hollow sleeve has at least one integral radially outwardly extending stem 37. The stem 37 terminates either flush with the peripheral surface of the tread 18 or projects slightly radially outwardly of the aforesaid peripheral surface of the tread. In this particular embodiment, the stainless steel fibers are available from Bekaert Fibre Technologies located at Research Triangle Park, N.C. under the reference BEKISHIELD GR type 75/C12-E/5. This product is pre-compounded with either a polyurethane material or a thermoplastic rubber material and, if desired, any specific color, such as yellow, all available from RTP Co. of Winona, Minn. The hollow sleeve 34 has a radially inwardly projecting bead filling the annular groove 33 and the stem 37 extends centrally through the hub 11 and. tread 18 and is housed within the plane of rotation of the wheel assembly 10. The stem 37 has a generally rectangular cross section as illustrated in FIG. 3, however, the cross section could be of any desired shape. The distal end of the stem 37 can, if desired, include a radially outwardly facing insignia 39 formed thereon. In instances where the insignia is present, the rectangular cross section of the stem 37 would terminate slightly radially inwardly of the outer peripheral surface of the tread 18 so that the tread stock 18 would cover fully the distal end of the rectangular configuration while simultaneously facilitating an exposure to the periphery of the wheel of only the insignia.

Assembly

The assembly has been somewhat indicated above but will be reviewed to ensure a complete understanding of the invention.

The bearing assembly 13 is preconstructed and is placed into a mold with a central pin in the mold being received into the central opening 28 through the axle 16. The mold includes the feature of the hollow sleeve 34 and the stem 37. Synthetic resin material impregnated with electrically conductive material, as described above, is injected into the mold cavity so that the material will enter the annular groove 33 in the peripheral surface of the outer shell 14 of the bearing assembly 13. After curing, the bearing assembly with the hollow sleeve and stem now operatively electrically coupled to the peripheral surface 31 of the bearing assembly 13 is placed into a further mold so that a central pin therein is again received into the central hole 28 through the axle 16. Synthetic resin material. is injected molded into the cavity to form the hub 11. After curing of the hub material, the aforesaid assembly is now placed into a further mold having a central pin therein which is received into the hole 28 through the axle 16 to facilitate an injection of tread stock 18 to form the tread of the wheel. This method of assembly assures that the peripheral surface of the tread stock 18 is concentric with the axis of rotation A of the bearing assembly 13.

In this particular embodiment, the synthetic resin material for the hub 11 is polypropylene. The tread stock is made of an elastomer material, namely a polyurethane material or thermoplastic rubber material.

If desired, the electrically conductive fibers can be pre-compounded with the polyurethane or thermoplastic rubber material. It is also preferable for the material of the tread and the material of the hollow sleeve 34 and stem 37 to be made of the same material so that an even wear characteristic will occur.

In use, accumulated static electricity will be allowed to discharge through the stem 37 upon each revolution of the wheel upon engagement of the distal end thereof with the floor.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A wheel assembly, comprising:

an electrically conductive outer shell in which is housed a bearing assembly for said wheel assembly:

a hollow sleeve of synthetic resin material impregnated with electrically conductive material operatively electrically coupled to a peripheral surface of said electrically conductive outer shell, said hollow sleeve having at least one radially outwardly extending stem integral therewith;

a synthetic resin material hub and tread configured to envelop said metallic outer shell, said hollow sleeve and said stem, a distal end of said stem terminating at least one of flush with and radially outwardly of a peripheral surface of said tread to contact to a surface supporting said wheel construction with each revolution of said wheel construction and to effectively facilitate a discharge of static electricity through said hollow sleeve and said stem in response thereto.

2. The wheel construction according to claim 1, wherein said hollow sleeve is configured to envelop a fragment of said peripheral surface of said electrically conductive outer shell.

3. The wheel construction according to claim 2, wherein said peripheral surface of said electrically conductive outer shell has a first diameter, at least one region of said peripheral surface having a second diameter, and wherein said electrically conductive material of said hollow sleeve envelops said second diameter region.

4. The wheel construction according to claim 3, wherein said second diameter is less than said first diameter.

5. The wheel construction according to claim 1, wherein said synthetic resin material for said hub is different than said synthetic resin material of said tread.

6. The wheel construction according to claim 5, wherein said synthetic resin material of said hub is polypropylene.

7. The wheel construction according to claim 6, wherein said synthetic resin material of said tread is one of a polyurethane and thermoplastic rubber.

8. The wheel construction according to claim 1, wherein said distal end of said stem has a radially outward facing insignia configured thereon.

9. The wheel construction according to claim 1, wherein the synthetic resin materials of said tread and said hollow sleeve and stem are the same.

* * * * *